United States Patent
Min et al.

(10) Patent No.: US 7,478,399 B2
(45) Date of Patent: Jan. 13, 2009

(54) METHOD, SYSTEM AND PROGRAM PRODUCT FOR TRANSFERRING PROGRAM CODE BETWEEN COMPUTER PROCESSES

(75) Inventors: Hong Min, Poughkeepsie, NY (US); Egide Van Aerschot, La Grande Motte (FR); Paul J. Wanish, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 10/737,388

(22) Filed: Dec. 16, 2003

(65) Prior Publication Data

US 2004/0210879 A1    Oct. 21, 2004

Related U.S. Application Data

(63) Continuation-in-part of application No. 10/420,065, filed on Apr. 21, 2003, now Pat. No. 7,376,832.

(51) Int. Cl.
*G06F 9/44* (2006.01)
*G06F 15/16* (2006.01)

(52) U.S. Cl. ........................... 719/313; 709/231

(58) Field of Classification Search ......... 709/201–207, 709/217–219, 231, 236; 717/162–167; 718/106; 719/311–315, 319, 328, 330–332
See application file for complete search history.

(56) References Cited

U.S. PATENT DOCUMENTS

| | | | | |
|---|---|---|---|---|
| 5,944,781 | A * | 8/1999 | Murray | 709/202 |
| 6,272,559 | B1 | 8/2001 | Jones et al. | 709/330 |
| 6,292,933 | B1 * | 9/2001 | Bahrs et al. | 717/107 |
| 6,324,637 | B1 | 11/2001 | Hamilton | 711/216 |
| 6,345,306 | B1 | 2/2002 | Hintermeister et al. | 709/245 |
| 6,430,538 | B1 | 8/2002 | Bacon et al. | 705/9 |
| 6,442,563 | B1 | 8/2002 | Bacon et al. | 707/103 |
| 6,442,620 | B1 | 8/2002 | Thatte et al. | 709/316 |

(Continued)

OTHER PUBLICATIONS

IBM Research Disclosure #436168, "EC XML parser for parsing CML into Java Hashtable", Aug. 2000, pp. 1477-1478.

(Continued)

*Primary Examiner*—Meng-Ai An
*Assistant Examiner*—Charles E Anya
(74) *Attorney, Agent, or Firm*—Lily Neff, Esq.; Kevin P. Radigan, Esq.; Heslin Rothenberg Farley & Mesiti, P.C.

(57) ABSTRACT

Method, system and computer program product are provided for facilitating transport of program code between computer processes in an object-oriented computing environment. An object is provided which includes a hashtable having at least one set of elements integrated therein. One element of the at least one set of elements of the hashtable is program code. The program code is logic which employs as data input the hashtable itself. The object can be serialized at a sender computer process and transported to a receiver computer process, where the serialized data object is received and deserialized to retrieve the hashtable. The receiver computer process can add relevant data to the hashtable prior to invoking program code within the hashtable using as data input thereto only the hashtable. A technique for merging multiple hashtables from different computer processes into a common hashtable is also provided.

6 Claims, 7 Drawing Sheets

U.S. PATENT DOCUMENTS

| | | | |
|---|---|---|---|
| 6,487,607 B1 * | 11/2002 | Wollrath et al. | 719/330 |
| 6,504,554 B1 | 1/2003 | Stone et al. | 345/760 |
| 6,629,154 B1 * | 9/2003 | Jones et al. | 719/330 |
| 6,721,740 B1 * | 4/2004 | Skinner et al. | 707/10 |
| 2001/0047406 A1 * | 11/2001 | Araujo et al. | 709/223 |
| 2002/0010709 A1 | 1/2002 | Culbert et al. | 707/500 |
| 2002/0095423 A1 | 7/2002 | Dessloch et al. | 707/100 |
| 2002/0103758 A1 | 8/2002 | Powell | 705/51 |
| 2002/0194287 A1 | 12/2002 | Tyra et al. | 709/206 |
| 2003/0005170 A1 | 1/2003 | Wallman et al. | 709/315 |

OTHER PUBLICATIONS

IBM Research Disclosure #440132, "Generic XML generator from Java Hashtable", Dec. 2000, pp. 2180-2181.

Diep, et al., "Distributed Method, System and Computer Program Product for Establishing Security In A Publish/Subscribe Data Processing Broker Network", pending U.S. Appl. No. 10/420,065, filed Apr. 21, 2003.

Flanagan, David, Java™ in a Nutshell, Third Edition, O'Reilly & Associates, Inc., 1999, 12 pages.

* cited by examiner fig. 1 fig. 3 fig. 2 fig. 4 fig. 5 fig. 6 fig. 7 fig. 8 fig. 9 fig. 10

US 7,478,399 B2

METHOD, SYSTEM AND PROGRAM PRODUCT FOR TRANSFERRING PROGRAM CODE BETWEEN COMPUTER PROCESSES

CROSS REFERENCE TO RELATED APPLICATION

The present application is a continuation-in-part of U.S. patent application Ser. No. 10/420,065, filed on Apr. 21, 2003, and entitled "Distributed Method, System and Computer Program Product For Establishing Security In A Publish/Subscribe Data Processing Broker Network", which is hereby incorporated herein by reference in its entirety.

TECHNICAL FIELD

The present invention relates in general to data processing, and more particularly, to the field of computer program code transfer between computer processes, for example, in an object-oriented computing environment.

BACKGROUND OF THE INVENTION

Procedural programming, such as object-oriented programming directs the collection of data into a well known format, referred to as a class object. As a specific example, JAVA is a known procedural based computer language developed and licensed by Sun Microsystems, Inc. In the JAVA programming language, an object is created for distribution between computer processes. Data or code can be sent as a class object. When program code is sent as a class object, the object has a set of methods or programs within it, for example, INIT, RUN, etc. A receiving computer process of such a class object must know what each of the methods within the object are in order to provide a "well-formed" constructor for the method's execution.

Therefore, processing within an object-oriented environment, such as a JAVA programming environment, could be enhanced by providing an improved technique for passing program code between computer processes within such an environment.

SUMMARY OF THE INVENTION

The shortcomings of the prior art are overcome and additional advantages are provided through the provision of a method of transferring program code between computer processes. The method includes providing an object which comprises a hashtable, the hashtable having at least one set of elements, one element of the at least one set of elements comprising program code; and wherein the program code comprises logic which employs as data input the hashtable itself. In enhanced aspects, the at least one set of elements comprises multiple tuples, each tuple comprising a first element and a second element, and wherein the second element of at least one tuple comprises the program code, and the second element of at least one other tuple comprises data relevant to the program code. The providing can further include providing the object as a serialized data object and transporting the serialized data object from a sender computer process to a receiver computer process. The method can further comprise deserializing the serialized data object at the receiver computer process to obtain the hashtable, scanning the hashtable for program code, and invoking the program code with the hashtable as the only data input thereto. In addition, data can be added to the hashtable at the receiver computer process, wherein the data is relevant to the program code and is added prior to invoking of the program code using as data input the hashtable.

In another aspect, a method of transferring program code between computer processes is provided which includes providing multiple serialized objects, each object having a different hashtable therein, and transporting a first serialized object from a first sender computer process to a receiver computer process and transporting a second serialized object from a second sender computer process to the receiver computer process, and deserializing the first serialized object and the second serialized object at the receiver computer process to obtain a first hashtable and a second hashtable, wherein the first hashtable includes a first program code and the second hashtable comprises a second program code, and wherein the first program code comprises logic which employs as data input the first hashtable and the second program code comprises logic which employs as data input the second hashtable. The method can further comprise merging the first hashtable and the second hashtable at the receiver computer process into a common hashtable, and iterating through the common hashtable for program code to be invoked using the common hashtable as the only input thereto. Still further, the method can include adding data to the common hashtable at the receiver computer process, the data being relevant to program code in the common hashtable and being added prior to the invoking of the program code using as data input the hashtable.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, disclosed herein is a technique for transporting information, including program code, between computer processes, which may or may not be on the same computer system. A receiving computer process of a transported data object knows that the object represents a hashtable, and that the tags in the table are for a tuple of information. One variable of the tuple is code which takes as data input the hashtable itself. Prior approaches for transferring information between computer processes sent code that required significant understanding at the receiver on how to invoke the code. The technique of the present invention enables the receiving computer process to receive a transported object and readily locate code within the object to be invoked on the data. The technique also facilitates the addition or merging of information from different computer processes within a common hashtable for processing. Many similar transported objects could be accumulated by a receiving computer process, and merged into a single hashtable for enhanced processing. These as well as other aspects and advantages of the present invention are described below with reference to FIGS. 1-10.

Figure 1:
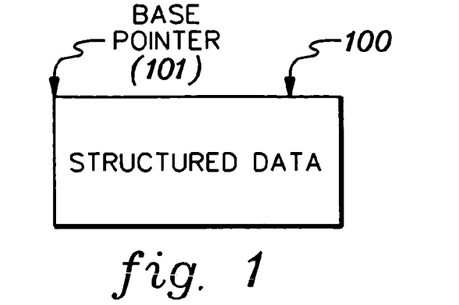
FIG. 1 is a representation of a structured data format for a procedural programming environment.
Figure 2:
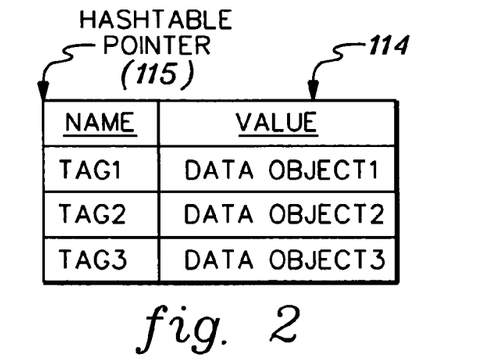
FIG. 2 is a representation of one embodiment of a hashtable for a JAVA programming environment wherein each data pair comprises a symbolic tag and a data object.
Figure 3:
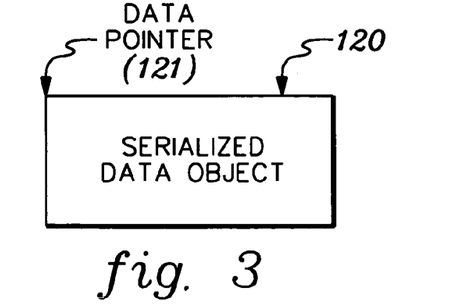
FIG. 3 is a simplified representation of a serialized data object for transfer between computer processes in an object-oriented environment.

FIG. 1 represents a structured data format 100 which is indexed using a base pointer 101, and which is representative of a known format employed by most procedural programming approaches. The base pointer addresses the first data item of the structured data 100. As one example, the structured data could comprise a class object in an object-oriented computing environment.

The JAVA programming language, which is described in various publications, including a textbook by David Flanagan entitled *"JAVA™ In A Nutshell"*, Third Edition, published by O'Reilly & Associates, Inc., ISBN: 1-56592-487-8 (November, 1999), the entirety of which is hereby incorporated herein by reference, is one example of an object-oriented programming environment. In JAVA, a hashtable 114 (FIG. 2) is defined and identified by a hashtable pointer 115. Items within the hashtable comprise tags (e.g., tag1, tag2, tag3) and associated data objects (e.g., data object1, data object2 & data object3). Each tag comprises a symbolic tag for identifying the associated data object.

The JAVA programming environment also formalizes a technique for passing data between computer systems by serializing data objects 120 (FIG. 3) to create bytes of data that represents the object. This serialized data object, which is identified using a data pointer 121, can be transmitted or recorded, and at some future time or remote location, converted back into the original data format. In an enhanced implementation, the serialized data object 120 could be encrypted with a secret key to protect the content of the object, as described further in the above-incorporated patent application entitled "Distributed Method, System and Computer Program Product For Establishing Security In A Publish/Subscribe Data Processing Broker Network".

Figure 4:
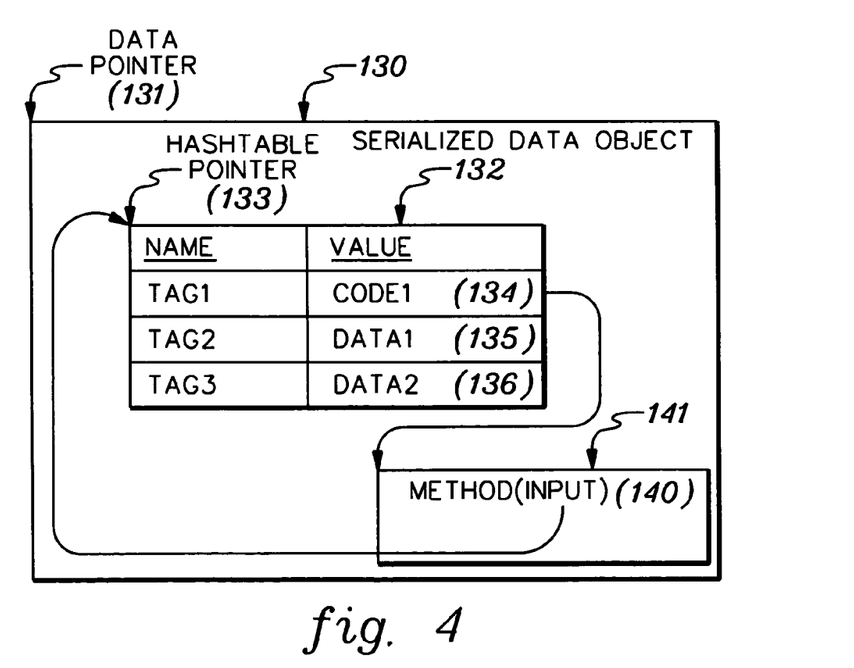
FIG. 4 is a representation of one embodiment of a serialized data object containing a hashtable with data and program code, in accordance with an aspect of the present invention.

FIG. 4 depicts one example of a serialized data object 130 employing a hashtable 132, in accordance with an aspect of the present invention. This serialized data object 130 is referenced by a data pointer 131, and hashtable 132 is referenced by a hashtable pointer 133. In this example, the hashtable includes both code and data. For example, one item within hashtable 132 is a tuple comprising tag1, code1 134. Associated with this tuple is a method 140 which takes as input a single input parameter 141, which is the address of the hashtable that the method is addressed by. In other words, the code to process the table data is itself within the hashtable. Hashtable 132 also includes tuples which comprise data items, for example, tag2, data (135) and tag3, data2 (136). In another example, hashtable 132 could include only one tuple comprising program code that is to be transported between computer processes. In such a case, the data to be operated on by the code can be added by the receiving computer process prior to invoking of the code. In either case, however, the program code takes as a single input the hashtable within which the code resides. Data to be operated on by the program code can either originate with the sender computer process or the receiver computer process, or be sender computer process data that is updated by the receiver computer process, depending upon the particular application.

Those skilled in the art will note from the above discussion that presented herein is a technique which allows transport of both data and program code to process the data, and enables the receiving computer process of a serialized data object to acquire functions for processing the data, both shipped and provided, without needing to know how to use the code contained within the hashtable. If desired, the code can, by definition, return a Boolean response on whether the code operation was successful. A false indication could be considered failure of the service transported to the receiving computer process.

Since the technique presented herein transmits a basic type of data object between computer processes, there are few rules needed on how to use the data object. The receiving computer process of a serialized data object would simply deserialize the data object, yielding a single object. As noted above, this object is a hashtable that contains program code which comprises logic that employs as data input the hashtable itself. The relevant data can be added to the hashtable by the sending computer process and/or the receiving computer process.

In another aspect, the tag values in a hashtable could all relate to a registered domain name. As an example, certain tag values might be "com.ibm.pok.code", "com.ibm.pok.key1" and "com.ibm.pok.key2". These variable all relate to each other and would form a set of tuples. The receiver of a hashtable containing this information could use this for processing other data. As an example, if a client key is to be processed, it could be added to the hashtable as "route.key", as well as its value. To evaluate the key, any program code that ends with ".code" could be invoked with a single parameter of the hashtable. The return values of true or false would provide an indication that the program code completed processing and the key should be accepted or rejected.

Figure 5:
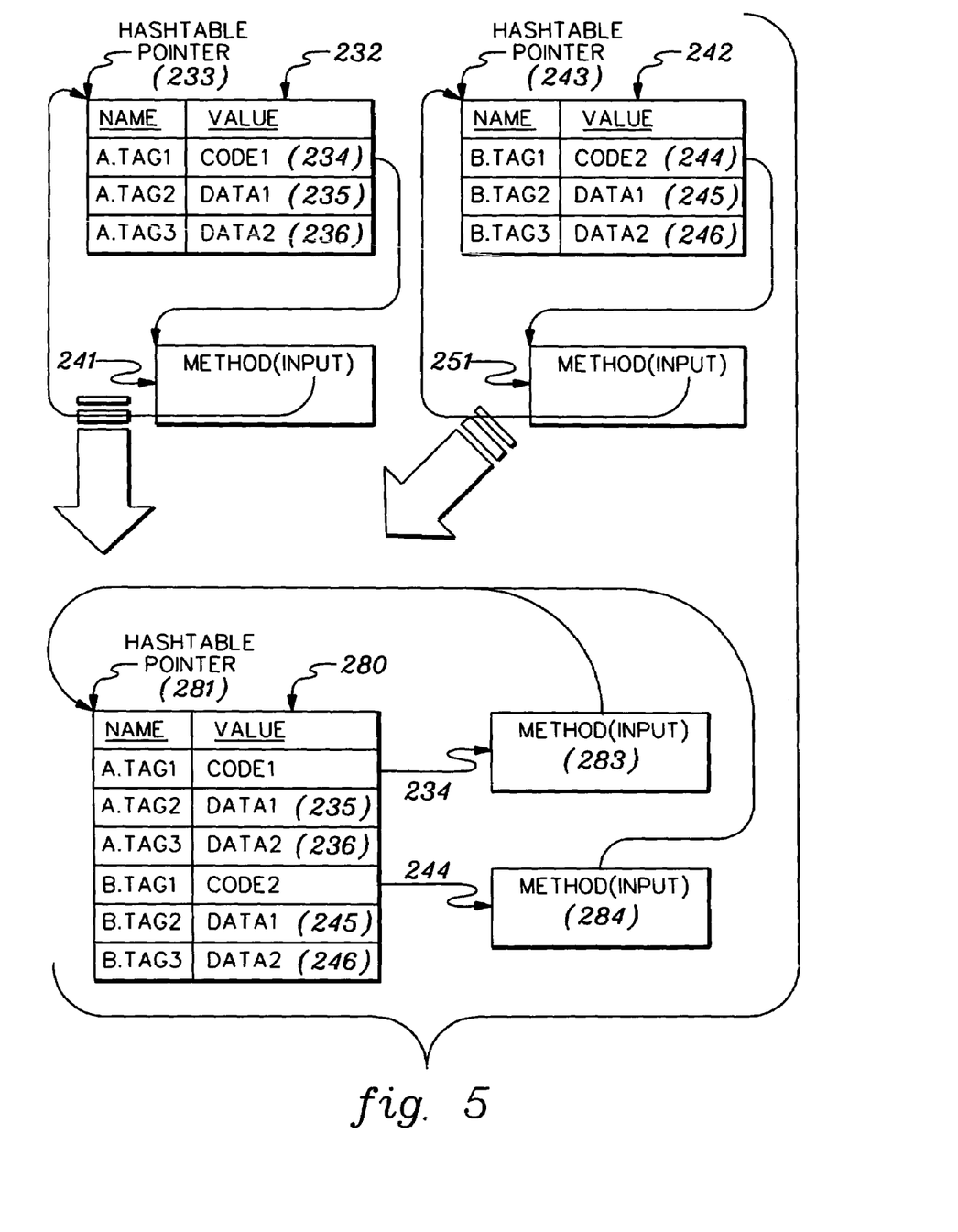
FIG. 5 is a representation of one embodiment of combining different hashtables into a common hashtable for enhanced processing thereof at a receiving computer process, in accordance with an aspect of the present invention.

FIG. 5 depicts a further enhancement in accordance with an aspect of the present invention, wherein hashtables 232, 242 within multiple data objects are merged together into a single hashtable 280, and the multiple hashtable pointers 233, 243 are replaced with a new hashtable pointer 281. The tag and data or code tuples are joined into the single, common table. Thus, tuples 234, 235, 236 and the associated processing method 241 from hashtable 232 and tuples 244, 245, 246 and the associated method 251 from hashtable 242 are all placed or copied into the common hashtable 280. Since the definition of a method implemented by code within the hashtable is to point to the hashtable within which the code exists, then the methods 241 & 251 have new input 283, 284, respectively, which points to the merged hashtable 280.

Because there might be a "fan out" of requests by computer systems which integrate facilities, the technique depicted in FIG. 5 provides a way to organize different, but similar serialized data objects. Many hashtables could be employed in a particular process, and these could be integrated into a single merged hashtable at the receiving computer process, or alternatively, the hashtables could be organized into the form of a linked list. Advantageously, this aspect of the invention provides an approach for organizing multiple data objects and consolidating the objects for enhanced processing of diverse routines.

Figure 6:
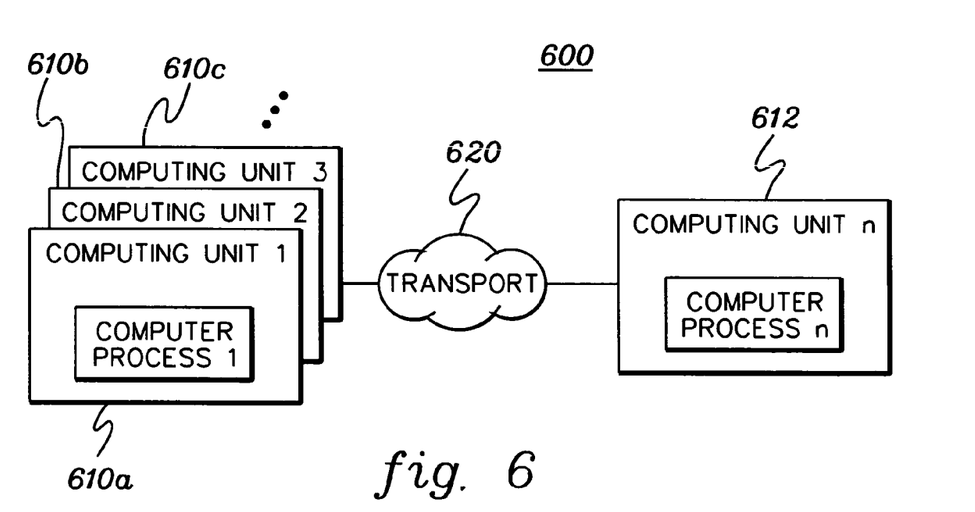
FIG. 6 is a representation of one embodiment of a computing environment having multiple computing units which communicate, in part, employing an information and program code transport facility, in accordance with an aspect of the present invention.

FIG. 6 depicts one embodiment of a computing environment, generally denoted 600, within which the techniques described above can be employed. Environment 600 includes multiple computing units 610a, 610b, 610c & 612, which may comprise distinct computer systems that communicate with each other via a transport mechanism 620, such as a local area network (LAN) or a wide area network (WAN). Alternatively, transport of the serialized data objects between computer processes could take various forms, including storing to a floppy disk and delivering the disk manually to a different computer system. How the serialized data objects move between the computer processes is not relevant to the subject matter presented herein.

The computing units may comprise any of various computer systems commercially available today. For example, a computing unit might comprise a system based on the UNIX architecture, such as a pSeries computer system executing an AIX operating system offered by International Business Machines Corporation, which could support the JAVA programming language. Within each computing unit, various computer processes are executing, and as explained above, it is often desirable to allow for the transmission of information, including program code, between processes. In this example, "computer process n" could be receiving program code in the form of hashtables encased in serialized data objects from multiple sending computer processes (e.g., "computer process 1", etc.) running on different computing units 610a, 610b & 610c, etc.

By way of specific example, the following JAVA code is an example of program code that might be integrated into a hashtable to be forwarded as a serialized data object between computer processes. This program code includes an example of a method 140 (FIG. 4), and the code is defined to take as a single input the hashtable itself.

```
import java.util.*;
public class Method implements Serializable { //simple logic [140]
    public Method(){} // Simple constructor
    public Integer code(Hashtable x) {// Transported Logic
        String topic; // Local work variable
```

-continued

```
        Integer num; // Local work variable
        topic = (String)x.get("Topic"); // Extract passed Topic
        num = (Integer)x.get("NUM"); // Pick up passed number
        System.out.println("Method:"+topic+"Num:"+num); // Show
        return num; // Return code of the number
    }
}
```

Figure 7:
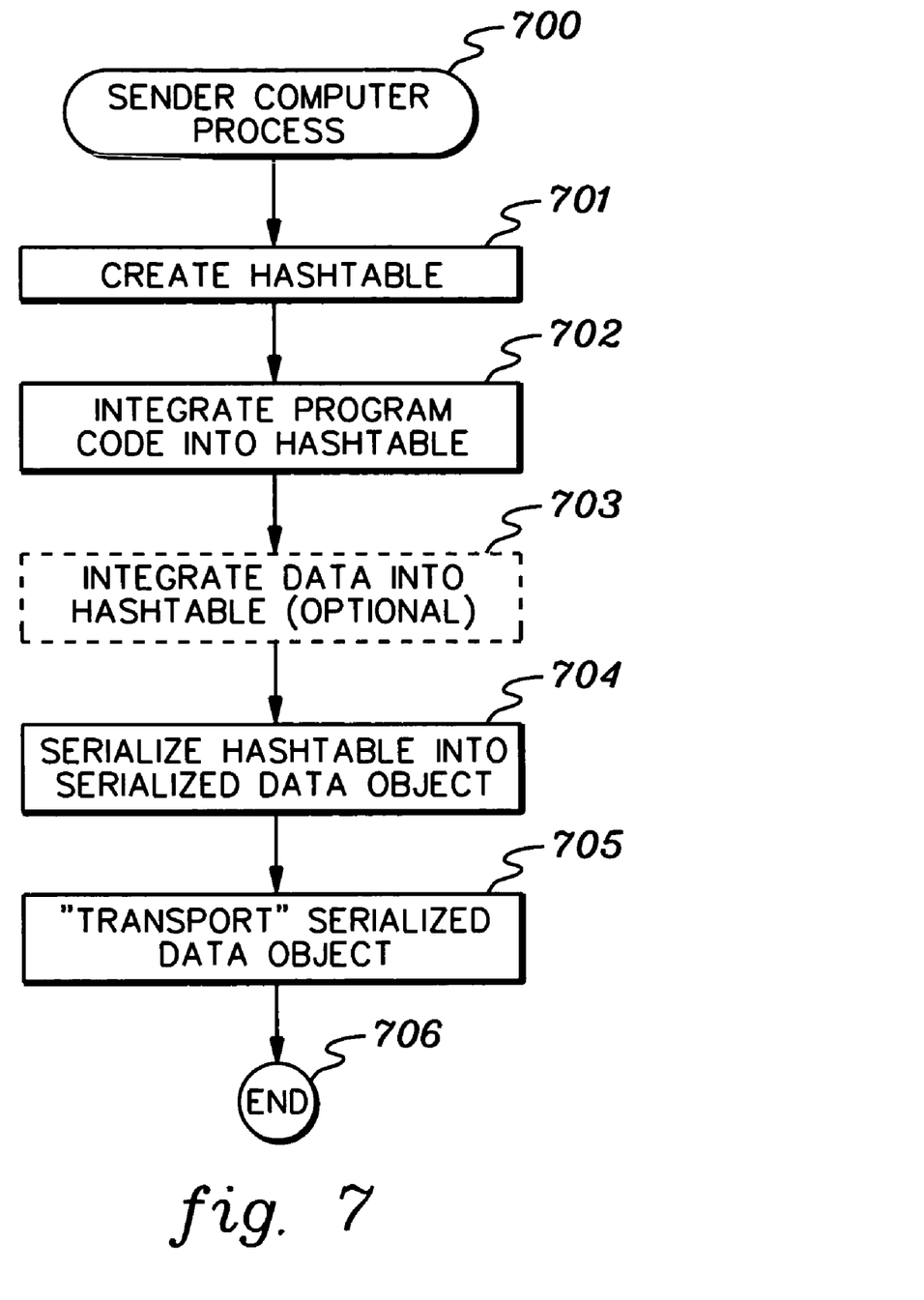
FIG. 7 is a flowchart of one embodiment of processing at a sender computer process for providing a serialized data object having a hashtable with program code integrated therein, in accordance with an aspect of the present invention.

FIG. 7 is a flowchart of one example of processing at a sender computer process 700 for preparing a serialized data object for transport. The processing includes creating an empty hashtable object 701 which has a null set of tuples. This hashtable can be readily created, as one example, using the JAVA programming language. Program code is then integrated into the hashtable 702, which may comprise one or more tuples of the hashtable. Optionally, data relevant to the program code can also be included in the hashtable 703. Thereafter, the hashtable object undergoes serialization to produce a serialized data object 704, which essentially converts the hashtable object into a byte stream. The serialized data object can then be transported 705 from the sender computer process to one or more receiver computer processes. This transportation could, for example, be across a network, or could occur in some other manner, for example, by writing the serialized data object to a disk, which is then delivered to a receiving computing process. This completes the processing flow at the sender 706.

By way of specific example, the following JAVA code could be employed by a sender computer process to assemble a serialized data object having a hashtable with program code therein and relevant data. The reference numbers in brackets correspond with the various processing steps of FIG. 7.

```
import java.io.*;
import java.util.*;
import java.lang.*;
public class Send { // TEST PROGRAM;CREATE SERIALIZED OBJ
    public static void main(String args[]) throws Exception {
        boolean resolvelt;
        Object Method = null;
        Hashtable x = new Hashtable( ); // create package to serialize [701]
        x.put("NUM",new Integer(1)); // Pass along information [703]
        try {
            Method = (Class.forName("Method").newInstance( ));
            x.put("Method", Method);// the routine to execute [702]
            ObjectOutputStream out = new ObjectOutputStream(new
                FileOutputStream("temp_stor"));// Pass in file(as example) [704]
            out.writeObject(x);     // Move object to file [705]
            out.close( );   // Close the output file
        } catch(Exception e) {System.out.println("Exception"+e);}
    }
}
```

Figure 8:
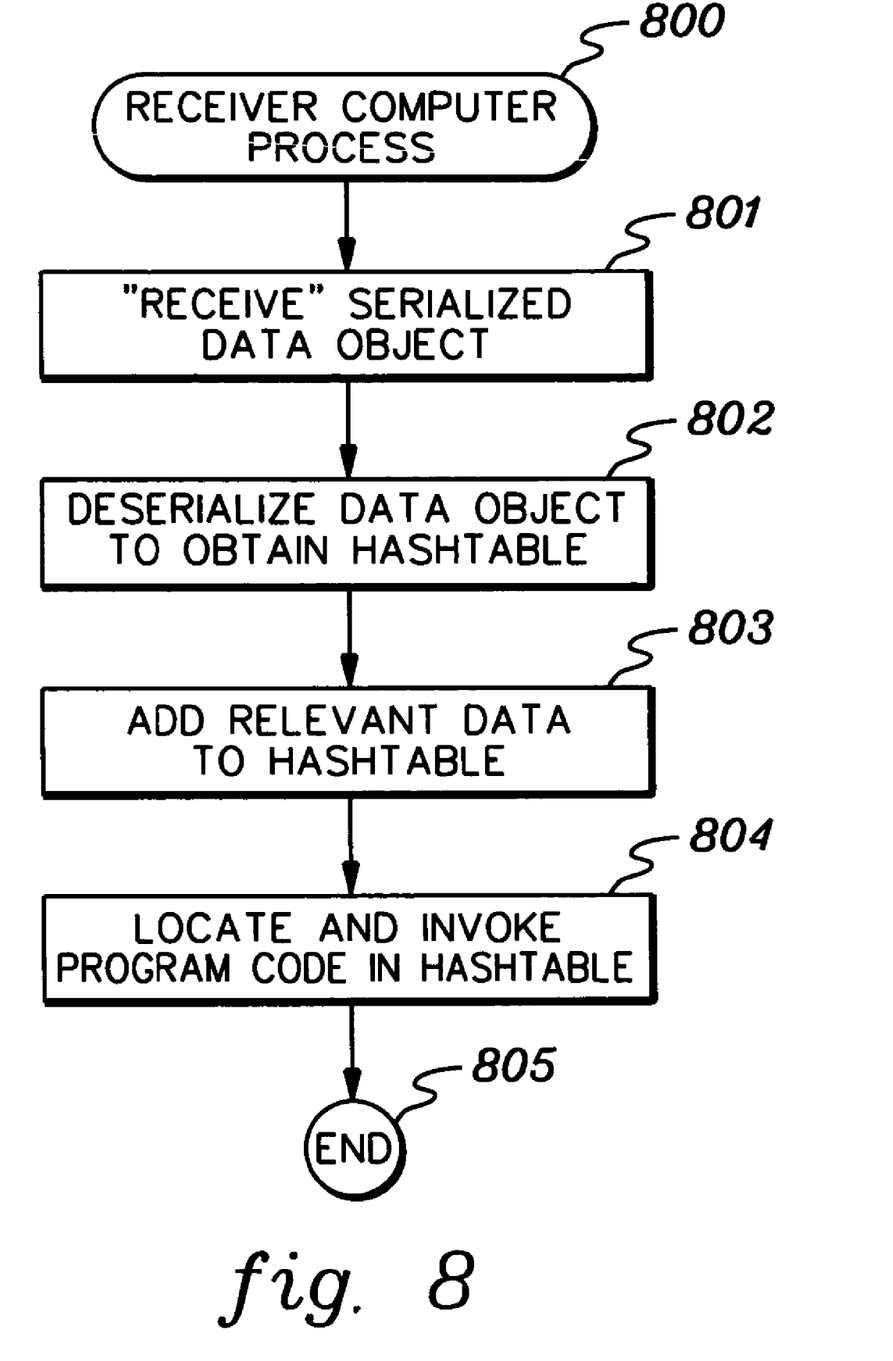
FIG. 8 is a flowchart of one embodiment of processing at a receiver computer process for receiving a serialized data object, deserializing the data object to retrieve an original hashtable, adding relevant data to the hashtable and then locating and invoking program code in the hashtable, in accordance with an aspect of the present invention.

FIG. 8 is a flowchart of one example of processing at a receiver computer process 800, which includes "receiving" by any means a serialized data object 801. The received data object is deserialized to obtain the original hashtable 802. Relevant data can be added by the receiver computer process to the hashtable 803 for use by the method implemented by the program code contained within the hashtable. When a receiver computer process receives a serialized data object from a sender computer process, it is assumed that there is a relationship between the sender and receiver. In this relationship, the receiver knows generally that the serialized data object is the hashtable, and the receiver knows that code is contained within the hashtable. As one example, the receiver computer process may be attempting to validate a user id. In order to do so, the receiver needs to pass to the computer code contained within the hashtable the id to be validated. Thus, the receiver adds the relevant data to the hashtable prior to invoking of the program code within the hashtable. Once the data within the hashtable is complete, processing locates and invokes the program code in the hashtable 804. Depending upon the outcome of the program code processing, the receiver computer process may take further action and/or send a reply to the sender computer process, which completes the processing flow 805.

One example of JAVA code that allows a receiver to process a received serialized data stream containing a hashtable would be:

```
import java.io.*;
import java.util.*;
import java.lang.*;
public class Receive { //TEST PROGRAM; RECEIVER OF OBJECT
    public static void main(String args[]) throws Exception {
        ObjectInputStream in = null; // Input Data Object
        Hashtable x = new Hashtable( ); // deserialize object
        try {
        in = new ObjectInputStream(new
        FileInputStream("temp_stor")); // [801]
        x = (Hashtable) in.readObject( );// Expand
        Object into Hashtable [802]
        x.put("Topic",new String("com.IBM.*"));// Pass publish topic [803]
        Method sem = (Method) x.get("Method");//Locate Code [804]
        Integer rc = ((Integer) sem.code(x));//Execute Code [804]
        System.out.println("Returned="+rc);// Show return code
        in.close( );    // close object
        } catch(Exception e) {System.out.println("Exception"+e);}
    }
}
```

The reference numbers in brackets at the end of certain statements correspond to the above-discussed processing steps of FIG. 8.

Figure 9:
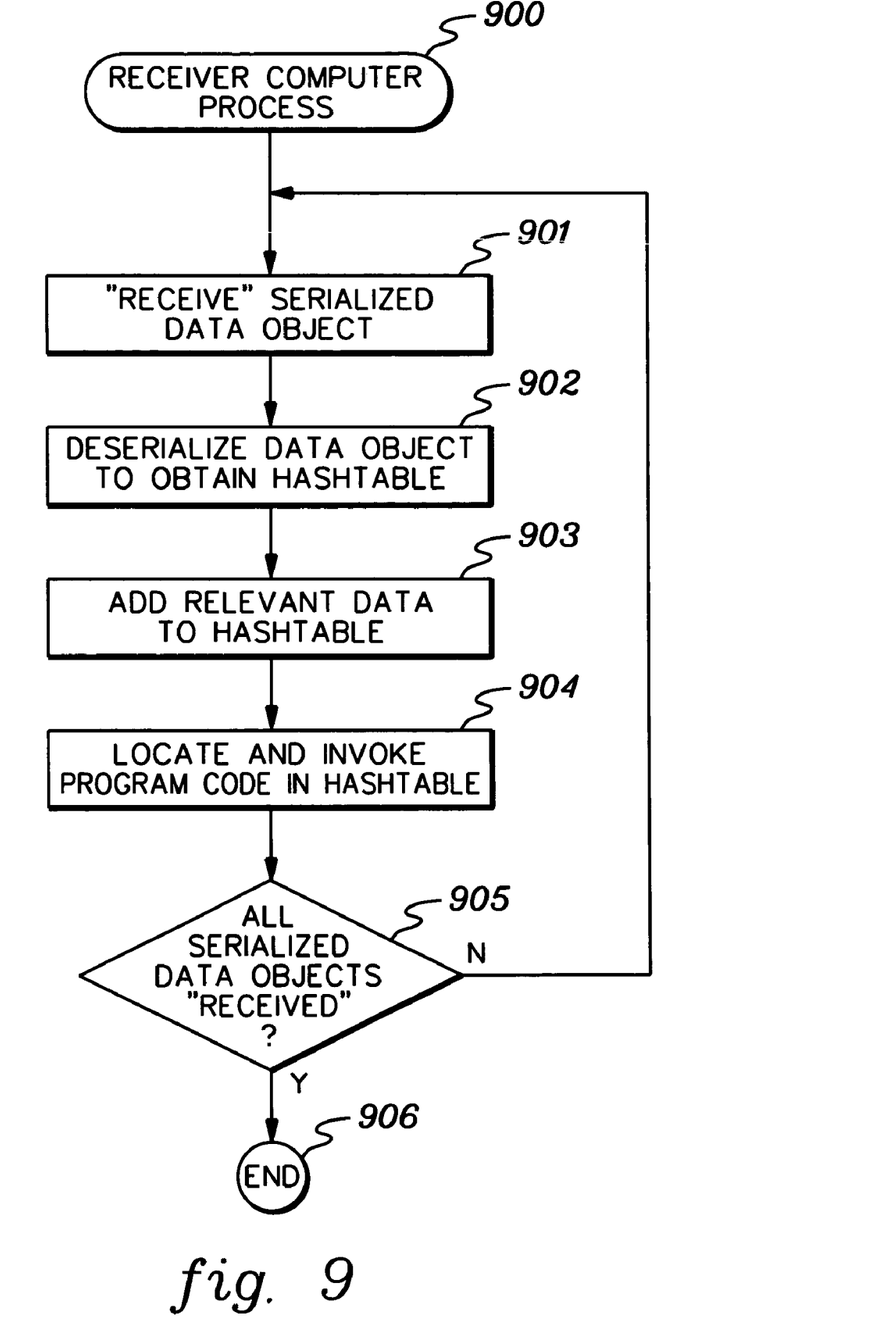
FIG. 9 is a flowchart of an alternate embodiment of processing at a receiver computer process for receiving multiple serialized data objects, and iteratively processing the objects to locate and invoke program code within each hashtable of the multiple serial data objects, in accordance with an aspect of the present invention.

FIG. 9 depicts an alternate embodiment wherein sequential processing of multiple serialized data objects is employed at a receiver computer process 900. A first serialized data object is received 901, again by any means, and deserialized to obtain the hashtable contained therein 902. Data relevant to the program code contained within the hashtable is added to the hashtable 903 by the receiving process, after which the program code is located and invoked 904. Processing then determines whether all serialized data objects have been received and processed 905. If "no", processing returns to receive a next serialized data object. Otherwise, the processing flow is complete 906. Advantageously, integrating program code into hashtables and requiring the program code to take as data input only the hashtable itself, simplifies management of code from various sending computer processes. The data objects received from the different computer processes could comprise different program codes entirely, or could comprise different steps in a common computer process, for example, all could be security authentication modules.

Figure 10:
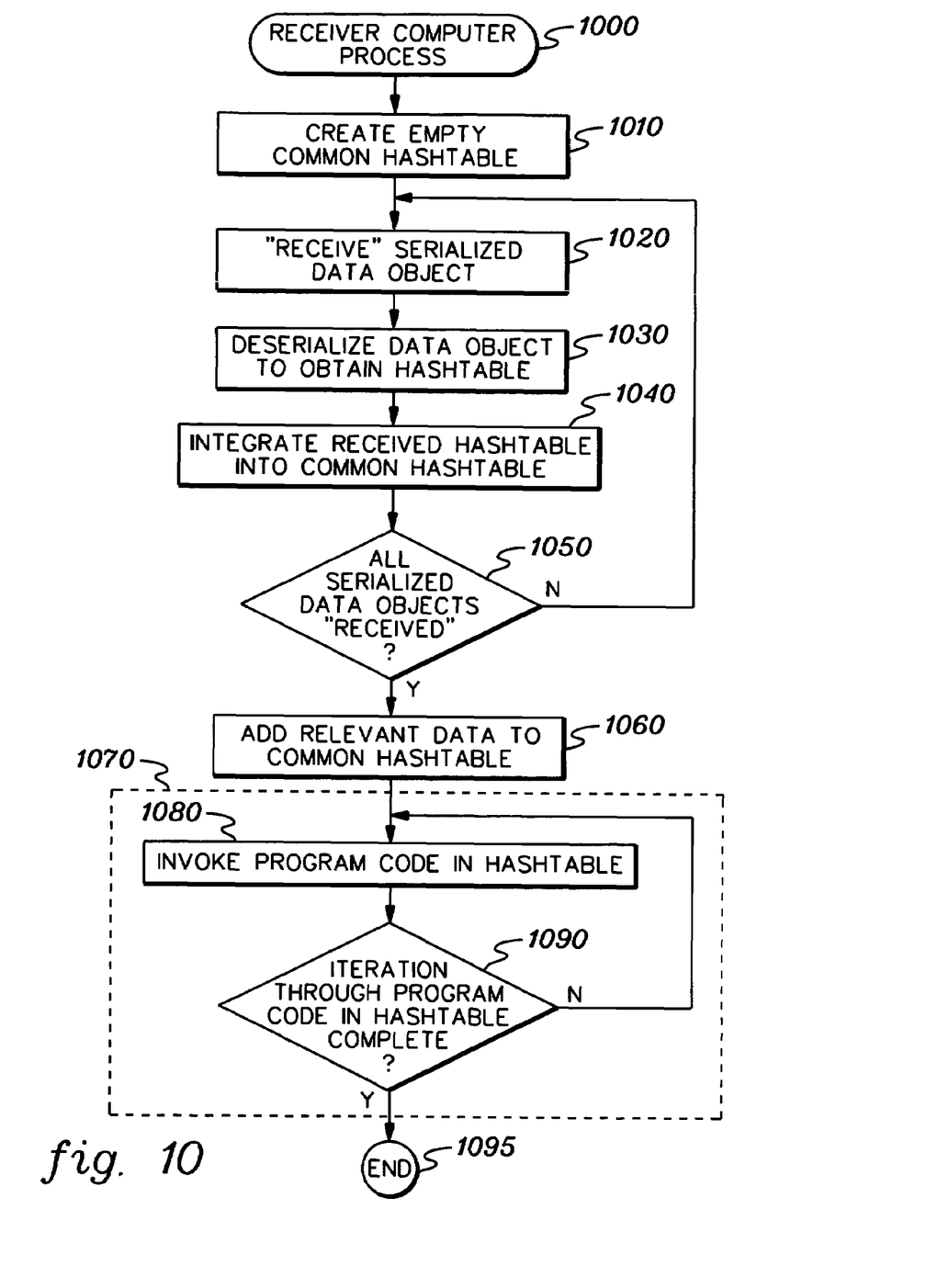
FIG. 10 is a flowchart of one embodiment of processing at a receiver computer process for merging hashtables from multiple serial data objects into a common hashtable, adding relevant data to the common hashtable, and then iterating through the common hashtable for program code, in accordance with an aspect of the present invention.

FIG. 10 depicts still another embodiment of processing at a receiver computer process 1000 wherein multiple hashtable objects are merged into a common hashtable, which is then processed by the receiver computer process. The receiver initially creates an empty common hashtable 1010, and then enters a loop wherein a serialized data object is received 1020, and deserialized to obtain the received hashtable 1030. The received hashtable from this data object is then integrated into the common hashtable 1040, and processing determines whether all serialized data objects have been received 1050. If "no", then processing loops back to receive a next serialized data object. If "yes", then the received computer process can add any relevant data to the common hashtable 1060. This addition of data could be relevant to any one or more of the programs now referenced within the common hashtable. Once the hashtable is complete, then processing iterates through the common hashtable for program code 1070. This iteration includes invoking a program code from the common hashtable 1080, and then determining whether iteration through all program code in the hashtable has been complete 1090. If "no", then the next program code in the hashtable is invoked. Once all program code has been invoked, the processing flow is complete 1095, and depending upon the logic contained therein, the receiver computer process may take further action, and/or may notify the sender computer processes of the results of the processing.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

what is claimed is:

1. A method of transferring executable program code between computer processes, the method comprising:
  providing, by a sender computer process, an object which comprises a hashtable, the hashtable having at least one set of elements, one element of the at least one set of elements comprising executable program code, the providing comprising:
    creating an empty hashtable;
    integrating executable program code into the hashtable; and
    serializing the hashtable into a serialized data object for transport to a receiver computer process;
  wherein the executable program code comprises logic which employs as the only input the hashtable within which the program code logic resides;
  transferring the object from the sender computer process to the receiver computer process, retrieving the executable program code from the hashtable at the receiver computer process, adding data to the hashtable by the receiver computer process, and invoking the executable program code with the hashtable as the only data input thereto, wherein data is added to the hashtable by the receiver computer process prior to invoking of the executable program code retrieved from the hashtable with the hashtable as the only data input thereto;

wherein the providing comprises providing multiple serialized objects, each serialized object having a different hashtable therein, and transporting a first serialized object from a first sender computer process to the receiver computer process and transporting a second serialized object from a second sender computer process to the receiver computer process, and deserializing the first serialized object and the second serialized object at the receiver computer process to obtain a first hashtable and a second hashtable; and wherein the method further comprises creating at the receiver computer process an empty common hashtable, integrating the first hashtable from the first sender computer process and the second hashtable from the second sender computer process into the common hashtable, adding data to the common hashtable at the receiver computer process, the data being relevant to executable program code in the common hashtable integrated therein from the first hashtable or the second hashtable, and being added prior to invoking the executable program code using as data input only the common hashtable, and iterating through the common hashtable for executable program code to be invoked using the common hashtable as the only data input thereto.

2. The method of claim 1, wherein the at least one set of elements comprises multiple tuples, each tuple comprising a first element and a second element, and wherein the second element of at least one tuple comprises the program code, and the second element of at least one other tuple comprises data relevant to the program code.

3. The method of claim 1, wherein the first sender computer process, the second sender computer process, and the receiver computer process are on different computing units.

4. A system for having a processor transferring executable program code between computer processes, said system comprising:

means for providing, by a sender computer process, an object which comprises a hashtable, the hashtable having at least one set of elements, one element of the at least one set of elements comprising executable program code, the means for providing comprising means for:

creating an empty hashtable;

integrating executable program code into the hashtable; and serializing the hashtable into a serialized data object for transport to a receiver computer process;

wherein the executable program code comprises logic which employs as the only input the hashtable within which the program code logic resides;

means for transferring the object from the sender computer process to the receiver computer process, for retrieving the executable program code from the hashtable at the receiver computer process, for adding data to the hashtable by the receiver computer process, and for invoking the executable program code with the hashtable as the only data input thereto, wherein data is added to the hashtable by the receiver computer process prior to invoking of the executable program code retrieved from the hashtable with the hashtable as the only data input thereto;

wherein the means for providing comprises means for providing multiple serialized objects, each serialized object having a different hashtable therein, and for transporting a first serialized object from a first sender computer process to the receiver computer process and for transporting a second serialized object from a second sender computer process to the receiver computer process, and means for deserializing the first serialized object and the second serialized object at the receiver computer process to obtain a first hashtable and a second hashtable; and wherein the system further comprises means for creating at the receiver computer process an empty common hashtable, for integrating the first hashtable from the first sender computer process and the second hashtable from the second sender computer process into the common hashtable, for adding data to the common hashtable at the receiver computer process, the data being relevant to executable program code in the common hashtable integrated therein from the first hashtable or the second hashtable, and being added prior to invoking the executable program code using as data input only the common hashtable, and means for iterating through he common hashtable for executable program code to be invoked using the common hashtable as the only data input thereto.

5. The system of claim 4, wherein the at least one set of elements comprises multiple tuples, each tuple comprising a first element and a second element, and wherein the second element of at least one tuple comprises the program code, and the second element of at least one other tuple comprises data relevant to the program code.

6. The system of claim 4, wherein the first sender computer process, the second sender computer process, and the receiver computer process are on different computing units.

* * * * *